United States Patent Office 3,257,446
Patented June 21, 1966

3,257,446
PURIFICATION OF ACRYLONITRILE
Roy Grice, Surbiton, Alfred Frank Millidge, Coulsdon, and Frank Christopher Newman, Great Bookham, England, assignors to The Distillers Company Limited, Edinburgh, Scotland, a British company
No Drawing. Filed June 11, 1963, Ser. No. 286,944
Claims priority, application Great Britain, July 6, 1962, 25,946/62
6 Claims. (Cl. 260—465.3)

The present invention relates to the purification of acrylonitrile and in particular to the removal of acetonitrile from mixtures of acrylonitrile and acetonitrile.

One of the impurities which arise in the production of acrylonitrile, for example by the reaction of acetylene with HCN or by the reaction by propylene with ammonia and oxygen, is acetonitrile. Separation by straight fractional distillation is technically not feasible owing to the fact that the boiling points of acrylonitrile and acetonitrile are very close. It has already been proposed to effect the separation by distillation in the presence of water.

It has now been found that the separation of acetonitrile and acrylonitrile can be achieved more economically by carrying out an extractive distillation in the presence of a poly-hydroxy compound.

Accordingly the present invention is a process for the separation of mixtures of acrylonitrile and acetonitrile which comprises subjecting the mixture to an extractive distillation in the presence of a poly-hydroxy compound.

The poly-hydroxy compounds may be for example ethylene glycol, diethylene glycol, propylene glycol, or glycerol. The use of ethylene glycol is preferred.

Preferably the poly-hydroxy compound is used in admixture with water for instance mixed with 20 to 80% by weight of water. In operation the distillation may be effected by feeding the mixture of acrylonitrile and acetonitrile and the mixture comprising glycol either together or at separate points to the distillation column and withdrawing purified acrylonitrile containing water as distillate overhead whilst the acetonitrile is withdrawn with a glycol solution at its base. Preferably the mixture comprising glycol is introduced near the top of the column and the mixture of acrylonitrile and acetonitrile to be separated introduced some plates further down. The acetonitrile fraction is removed from the glycol or its solution for example by distillation and the glycol or its solution then recycled to the first still for re-use.

The process according to the present invention finds particular application for the purification of acrylonitrile which has been produced by the vapour phase reaction at elevated temperature of propylene, ammonia and molecular oxygen and in which small amounts of acrolein, hydrogen cyanide and consequently acrolein cyanhydrin, acetonitrile, and other impurities are co-produced.

The invention is further illustrated with reference to the following example.

Example 1

In a distillation column of 30 plates operating at normal pressure there are fed continuously per hour one part of a mixture of acrylonitrile containing 4% by weight of acetonitrile, 10 plates from the base, and 10 parts of an aqueous solution of 50% by volume of ethylene glycol at the top. The temperature in the kettle is maintained at 102° C. The distillate is acrylonitrile containing not more than 280 p.p.m. acetonitrile.

Example 2

Into the distillation column of 30 plates used in Example 1, operating at normal pressure, there are continuously fed per hour one part of acrylonitrile containing 4% w./w. acetonitrile, 10 plates from the kettle, and 10 parts of an aqueous solution of 30% v./v. ethylene glycol at the top. With a kettle temperature maintained at 102° acrylonitrile containing <100 p.p.m. acetonitrile is obtained overhead with the ratio of acetonitrile/acrylonitrile in the aqueous kettle bleed equal to 0.55.

Example 3

Into a distillation column of 50 plates, operating at normal pressure, there are continuously fed per hour one part of a mixture of acrylonitrile containing 4% w./w. acetonitrile, 20 plates from the base, and 10 parts of aqueous solution of 50% v./v. ethylene glycol at the top. With a kettle temperature maintained at 105° the acrylonitrile distillate contains <200 p.p.m. acetonitrile and the ratio of acetonitrile/acrylonitrile in the base aqueous glycol solution is 0.77.

Example 4

Into a distillation column of 50 plates, operating at normal pressure, there are continuously fed per hour one part of a mixture of acrylonitrile containing 4% w./w. acetonitrile 30 plates from the kettle, and 10 parts of an aqueous solution of 50% v./v. ethylene glycol at the top. The temperature on a plate ca. 10 plates from the kettle is automatically controlled at 85°, leading to a kettle temperature of 108–109°. Very pure acrylonitrile, containing <300 p.p.m. acetonitrile, is obtained overhead while the acetonitrile recovered from the aqueous glycol kettle bleed by stripping contains <5% w./w. acrylonitrile.

We claim:
1. A process for the separation of acrylonitrile from a mixture containing acrylonitrile and acetonitrile which comprises introducing a feed mixture of acrylonitrile and acetonitrile into a distillation zone, simultaneously introducing an aqueous mixture of a polyhydroxy compound selected from the group consisting of ethylene glycol, diethylene glycol, propylene glycol, and glycerol, into the distillation zone above the point at which the feed mixture is introduced, extractively distilling the feed mixture and the polyhydroxy compound, and withdrawing from the distillation zone purified acrylonitrile as an overhead and acetonitrile-containing polyhydroxy compound as the base product, wherein the aqueous mixture of the polyhydroxy compound contains from about 20% to about 80% by weight of water.
2. A process as claimed in claim 1 wherein the polyhydroxy compound is ethylene glycol.
3. A process as claimed in claim 1 wherein the mixture of the polyhydroxy compound is introduced near the top of the distillation zone.
4. A process as claimed in claim 1 wherein the acetonitrile is isolated from the polyhydroxy compound solution by distillation.
5. A process as claimed in claim 4 wherein the polyhydroxy compound solution is recycled to the distillation step.

6. A process as claimed in claim 1 employed in the purification of acrylonitrile produced by the vapour phase reaction at elevated temperature of propylene, ammonia and molecular oxygen.

References Cited by the Examiner
UNITED STATES PATENTS

| | | | |
|---|---|---|---|
| 2,171,795 | 9/1939 | Kautter | 203—64 X |
| 2,385,469 | 9/1945 | Salley | 260—465.3 |
| 2,494,116 | 1/1950 | Carpenter | 260—465.9 |
| 2,552,412 | 5/1951 | Drout et al. | 203—55 |
| 2,691,037 | 10/1954 | Bellringer et al. | 260—465.9 |
| 2,738,030 | 3/1956 | Keller et al. | 260—465.9 |
| 2,807,573 | 9/1957 | Robertson | 202—57 |
| 2,886,610 | 5/1959 | Georgian | 203—55 |
| 2,900,309 | 8/1959 | Valentine | 203—64 |
| 2,987,451 | 6/1961 | Sennewald et al. | 260—465.9 X |
| 3,069,331 | 12/1962 | Myerly et al. | 203—64 |
| 3,075,890 | 1/1963 | Chambers et al. | 203—55 |

NORMAN YUDKOFF, *Primary Examiner.*

CHARLES B. PARKER, *Examiner.*

F. E. DRUMMOND, J. F. BRUST, *Assistant Examiners.*